United States Patent [19]

Eicher

[11] 4,071,886
[45] Jan. 31, 1978

[54] SELF-ADJUSTING REGULATION SYSTEM
[75] Inventor: Walter Eicher, Gockhausen, Switzerland
[73] Assignee: Contraves AG, Zurich, Switzerland
[21] Appl. No.: 651,578
[22] Filed: Jan. 22, 1976
[30] Foreign Application Priority Data
  Feb. 6, 1975  Switzerland .................... 1467/75
[51] Int. Cl.² ............................................. G05B 11/36
[52] U.S. Cl. ................................... 364/118; 318/632; 318/621
[58] Field of Search .................. 318/621, 632, 635; 235/150.1

[56] References Cited
U.S. PATENT DOCUMENTS 3,419,771  12/1968  Bentley et al. ............. 318/635 X
3,819,999  6/1974  Platt ........................... 318/621 X Primary Examiner—Eugene G. Botz
Attorney, Agent, or Firm—Werner W. Kleeman

[57] ABSTRACT

A self-adjusting regulation system comprising a regulator embodying an input adder for forming the difference of the feedback magnitude and the command magnitude as well as a regulation device for forming an adjustment magnitude from such difference. A linearity detector produces a control signal upon the occurrence of a non-linear behaviour of the regulation circuit. A supplementary adder is arranged between the input adder and the regulation device and has its first input connected with the output of the input adder and its output connected with the input of the regulation device, whereas its second input is connected with the output of a supplementary device composed of a number N of similar integration stages forming a series. Each stage contains an integrator and an auxiliary adder, the output of which is connected with an input of the integrator via a control switch which can be actuated by the control signal. Further, the first input of the auxiliary adder is connected via a first multiplier with the first input of the supplementary adder and its second input is connected via a second multiplier with the output of the supplementary adder, whereas the output of the integrator of the last integration stage of the series forms the output of the supplementary device and for the remaining integration stages in each instance the output of the integrator of a given integration stage is connected with the third input of the auxiliary adder of the next following integration stage of the series.

7 Claims, 7 Drawing Figures

SELF-ADJUSTING REGULATION SYSTEM

BACKGROUND OF THE INVENTION

The present invention relates to a new and improved construction of a self-adjusting regulation system which automatically adjusts itself to an optimum circuit configuration in accordance with the characteristics of its regulation circuit.

The theory of regulation systems is well known, yet the designations used hereinafter in this disclosure will be defined in order to clarify the significance thereof:

The feedback magnitude is the magnitude which should be maintained at a reference value; it is the output magnitude of the load and an input magnitude of the regulator. A disturbance magnitude is that magnitude which has some influence upon the feedback magnitude, with the exception of the adjustment magnitude. The adjustment magnitude is that magnitude by means of which there is intentionally acted upon the feedback magnitude in order to eliminate the effect of the disturbance magnitude; it is the output magnitude of the regulator and an input magnitude of the load. The command magnitude is that magnitude which determines the reference value of the feedback magnitude; it is an input magnitude of the regulator. The regulation path is that portion of the regulation system where there is produced the feedback magnitude; the adjustment magnitude and possible disturbance magnitude are algebraically added and processed within the load. The regulator is that part of the regulation system where there is produced the adjustment magnitude; the command magnitude, the feedback magnitude and possible disturbance magnitudes are added and processed within the regulator. The feedback circuit consists of the load, the regulator and the connections which enable the proper delivery of the enumerated magnitude; in the event for instance owing to different physical characteristics the feedback magnitude cannot be directly utilized as the input magnitude of the regulator then it is converted by a sensor or feeler located in the regulation circuit into an input magnitude suitable for the regulator; in the event that for analogous reasons the adjustment magnitude cannot be directly utilized as the input magnitude of the load, then it is converted into an input magnitude suitable for the load by an adjustment element located in the regulation circuit.

The characteristics of the components of the regulation circuit are to be considered as known and generally possess imperfections which occur either for technical reasons or are brought into existence owing to the operating conditions of the regulation system. The latter for instance is the case if for operational reasons the feedback magnitude or the adjustment magnitude are subjected to conditions which limit their value or their changes, so that the normally linear characteristics of the regulation circuit become non-linear.

For instance, in a regulation system for the alignment of a target tracking theodolite in azimuth or elevation, the open regulation circuit normally possesses a linear transmission function. If, however, the current in a drive motor of the theodolite reaches a value which should not be exceeded, although the proper target tracking function would require a greater current, then a device which limits the current becomes effective in the regulation circuit and which permits the transmission function of the open regulation circuit to become non-linear.

In such type regulation system, the open regulation circuit of which possesses a linear or non-linear transmission function, depending upon the operating conditions, once there have been determined the characteristics of the regulation circuit it is not possible to obtain an optimum circuit configuration throughout the entire useful frequency bandwidth of the regulation system, i.e. to reduce as required the error of the different times derivatives of the feedback magnitudes (for instance position-, velocity-, acceleration- and impact errors) throughout the entire useful frequency range. A fine accommodation of the regulation circuit to the behaviour of the regulation system for achieving the smallest possible regulation errors in the range of the low frequencies leads to instability as soon as the regulation circuit, especially the open regulation circuit, no longer operates in a strictly linear manner. Under these conditions it is necessary, when optimizing the regulation circuit in the range of the low frequencies, to take into account the possibly occurring maximum non-linearity, so that in the normal instance of the linear behaviour there arises a loss in the precision of the regulation which must be accepted in favor of avoiding instability.

A further example of such type regulation system relates to the regulation of the temperature of a body wherein the disturbance magnitude is constituted by the thermal loss and the adjustment magnitude is constituted by an electrical current which delivers thermal energy to the body by the Joule effect. In this system the adjustment magnitude is constituted by an electrical resistor where there is developed the Joule-thermal energy, and which imposes upon the system the condition that the current should not exceed a certain value otherwise the resistor will become damaged or burn-out. A still further example of a similar type regulation system relates to the regulation of the pH-value of a solution wherein the disturbance magnitude is a pH-increase owing to a chemical reaction and the adjustment magnitude is an electrical current which actuates a valve, the opening of which controls the inflow of an acidic solution. In this system the adjustment element is constituted by the valve and a non-linearity arises when there is obtained the maximum inflow of the acidic solution which is governed by the conduit.

For these or similar regulation systems there is to be realized a stable regulation under all operation conditions with maximum precision provided that the optimization of the regulation circuit with regard to the precision of the regulation at the range of the lower frequencies is not limited by the required taking into account of the non-linear behaviour of the regulation circuit.

It is known to optimize the regulation circuit in two separate steps: Initially the characteristics of the regulator are accommodated to the situation of a linear behaviour of the regulation circuit in such a manner that there is realized the best obtainable regulation; thereafter there is provided a correction device which, upon the occurrence of non-linearity in the regulation circuit, modifies certain parameters thereof in such a manner that also in the case of maximum non-linearity there is realized the best obtainable regulation and in particular there does not arise any instability.

For instance, there is disclosed in U.S. Pat. No. 3,510,737 a regulation system for a positioning motor wherein the input magnitude of the regulator is divided into a low frequency portion and a high frequency portion and both such portions are separately processed in the regulator to a respective portion of the adjustment magnitude. Moreover, in the case of a linear behavior of the regulator the adjustment magnitude is formed from the sum of both portions. In the non-linear case the low-frequency portion of the adjustment magnitude is made equal to null and there is only effective the high frequency portion so that there can be reduced the overshooting of the feedback magnitude. With this known solution of the stability problem it is disadvantageous that the adjustment magnitude, when shifting from the linear case to the non-linear case or vice versa, changes in a jump-like or sudden manner, which can bring about undesired loads in the regulation system and, additionally, renders difficult switching of the system from a start-up in the manually-controlled mode of operation or the computer controlled mode of operation to the self-regulating mode of operation. At the moment of closing of the regulation circuit the transmission function of the regulator can assume one of two possible values, depending upon whether previously the open regulation circuit was operated in the linear range or in the non-linear range. Therefore, the command magnitude introduced manually or by the computer with the open regulation circuit is not unambiguously equivalent in its action to a single predeterminable feedback magnitude which is fed back to the regulator with closed regulation circuit.

In the German patent publication No. 2,226,882 there is proposed a method for the stabilization of a regulation system, the tendency towards instability of which is predicated upon the non-linearity of a saturatable component. Monitoring for non-linearity occurs and there is produced an appropriate control signal which brings about a change of the regulation circuit. This change resides in that upon the occurrence of a non-linearity the gain of the feedback loop is increased in order to realize a transmission function which restores the regulation system again close to the stability limit. In other words, the reduction of the gain of the regulator at the region of the low frequencies brought about by a non-linearity of the regulator is compensated in that the gain of the feedback loop is increased and at the input of the regulator there is reduced the sum of the command magnitude and the feedback magnitude and the regulation system again almost becomes stable because the regulator has again been operated at the limit of the linear range. With this known solution for the stability problem, the adjustment magnitude indeed does not alter in a surge or jump-like manner when the regulation system shifts from the linear operation to the non-linear operation or vice versa, because the adjustment magnitude remains constant upon saturation of the regulator. But also with this solution there is present the drawback that a surgeless switching of the regulation system from a manual- or computer-controlled operation to the self-regulating operation is not insured for at any moment in time, since also in this case at the instant of closing of the regulation circuit the transmission function between the feedback magnitude and the adjustment magnitude can assume one of two possible values, depending upon whether previously the open regulation circuit was operated in the linear range or in the non-linear range.

SUMMARY OF THE INVENTION

Hence, it is a primary object of the present invention to provide an improved self-adjusting regulation system which is not associated with the aforementioned drawbacks and limitations of the prior art proposals.

Another and more specific object of the present invention aims at the provision of a novel regulation system of the previously mentioned type wherein there can be realized optimization of the regulation circuit with regard to the precision and the stability of the regulation at the region of the lower frequencies in such a manner that, apart from the separate optimization for the case of linearity and for the case of non-linearity of the regulation circuit, there is also possible at any time the surgeless switching of the regulation system from the manually-controlled operation or the computer controlled operation to the self-regulating operation.

Now in order to implement these and still further objects of the invention, which will become more readily apparent as the description proceeds, the invention contemplates a self-adjusting regulation system comprising a regulator containing an input adder for forming the difference of the feedback magnitude and the command magnitude as well as a regulation device for forming the adjustment magnitude from such difference. The regulation circuit additionally is provided with a device for limiting the value of the input magnitude obtained by the feedback, this device controlling a linearity detector which upon the occurrence of a non-linear behavior of the regulation circuit produces a control signal. In the regulator there is arranged between the input adder and the regulation device a supplementary adder, the first input of which is connected with the output of the input adder and the output of which is connected with the input of the regulator device, whereas its second input is connected with the output of a supplementary device composed of a number N of similar integration stages forming a series. Each integration stage comprises an integrator as well as an auxiliary adder, the output of which is connected with an input of an integrator via a control switch which can be actuated by control signals. Furthermore, the first input of the auxiliary adder is connected via a first multiplier with the first input of the supplementary adder and its second input is connected through the agency of a second multiplier with the output of the supplementary adder, whereas the output of the integrator of the integration stage which is the last stage of the series forms the output of the supplementary device and for the remaining integration stages in each case the output of the integrator of a predetermined integration stage is connected with a third input of the auxiliary adder of the next following integration stage of the series.

For all of the integration stages the control switches are preferably in the closed position during linear operation of the regulation circuit. With non-linear operation of the regulation circuit the control signal generated by the linearity detector initiates opening of the control switch, so that all connections existing between the auxiliary adders and the integrator inputs are interrupted and at the input of each integrator there is present the value null, the integral of which is also equal to null. At the output of each integration stage, i.e., at the output of the corresponding integrator, there always then prevails a constant value which is the last prevailing output value prior to opening of the control switch.

In this way there is achieved the result that with linear behaviour or operation of the regulation circuit the difference of the feedback magnitude and the command magnitude is processed in the supplementary device before it is delivered to the regulation device. As will be explained more fully hereinafter this processing corresponds to the action of a low-pass filter of the Nth order. On the other hand, with non-linear operation of the regulation circuit there is achieved the result that the action of the supplementary device is eliminated, so that the regulation circuit experiences the necessary accommodation in order to avoid instability, and that at the moment that there is an elimination of the action there does not occur any jump-like change in the regulation circuit because the last action which was present prior to the elimination action is maintained as constant. By virtue of the fact that there are maintained at all integrators the last output values which prevailed prior to the occurrence of the non-linear behavior, there additionally remain in the entire supplementary device a combination of output values which at the moment of reoccurrence of the linear operation, that is to say, upon renewed closing of the control switch, constitutes a better combination than if all output values were to sink to the value null. Consequently, upon renewed occurrence of the action of the supplementary device both the change in the regulation circuit as also the time required for the regulation circuit to swing into the new state, are markedly reduced.

As already mentioned in the regulation system there is provided a device for limiting the value of the input magnitude obtained from the load, which device also controls a linearity detector which produces a control signal when the limiting action occurs. For instance, such may be a valve employed as an adjustment element which produces in a conventional manner a control signal for closing a control switch when it has reached the condition of maximum opening. As a further example it may be a conventional device for limiting an electrical current, which device produces a control signal when the limiting occurs. Examples of such devices can be found in the fields of application for temperature regulation as well as also in the regulation of the position of a motor.

The number N of integration stages in the supplementary device and the multiplication or multiplier coefficients of the multipliers are initially determined by the characteristics of the regulation circuit. In a regulation system the open regulation circuit always possesses a boundary frequency, in the range of which towards the higher frequencies there arises an amplitude drop and a phase shift of the transmission function, limiting the field of application of the regulation system. The utilization of a supplementary device acting as a low-pass filter of the Nth order in the regulation circuit brings about at the region of the lower frequencies indeed an increase of the amplitude factor of the transmission function desired for improving the precision but also an additional phase shift or rotation thereof which should not overlap with the first-mentioned phase shift in the frequency range, otherwise the boundary frequency will be shifted towards the lower frequencies. The greater the function order N that much steeper is the increase of the amplitude factor, but also the bandwidth and intensity of the disturbing phase shift. Therefore, the optimization of the regulation circuit with regard to the function order N of the supplementary device is based upon a compromise which must be made from case to case. For instance, in a regulation system for the alignment of a target tracking-theodolite in azimuth or elevation the optimum order is $N=2$, although also $N=1$ and $N=3$ define supplementary devices, the use of which improve the properties of the regulation circuit.

With the determination of the multiplier coefficients there is first of all to be fixed the variation span of the amplitude factor. Advantageously a such is made equal to 1 in the range of maximum frequency and in the range of lowest frequencies equal to the desired value, wherein this value can be written as a fraction $(A_N/B_N)$ for better formulation of the calculation.

The index N corresponds to the function order of the supplementary device which is to be calculated. Therefore, while utilizing the Laplace transformation there can be written the corresponding transmission function of a low-pass and there can be resorted to the processing of a time-dependent signal $x(t)$ to a time-dependent signal $y(t)$, wherein $x(t)$ appears at the first input and $y(t)$ at the output of the supplementary adder.

With a function order $N=1$ there can be written:

$$y(p) = \frac{A_1(1 + B_1 p)}{B_1(1 + A_1 p)} \cdot x(p)$$

wherein $p$ constitutes the conventional Laplace operator. From this follows:

$$B_1 y(t) + A_1 B_1 \dot{y}(t) = A_1 x(t) + A_1 B_1 \dot{x}(t).$$

By solving for $\dot{y}(t)$ and integrating with the determination that for $t=O$ also there is valid $y(t)=x(t)$, there results:

$$y(t) = x(t) + \int_O^t \left\{ \frac{1}{B_1} x(t) - \frac{1}{A_1} y(t) \right\} dt$$

From this equation it will be apparent that the supplementary device of the first order comprises an integration stage, and the supplementary adder adds the non-processed value $x(t)$ with the output value of this integration stage. In the integration stage there is applied to the non-processed value $x(t)$ the coefficient $(1/B_1)$ and the processed value $y(t)$ has applied thereto the coefficient $(-1/A_1)$, which operations occur at the relevant multipliers. The integration takes place for the sum of the acted upon values which are formed in an auxiliary adder and delivered to an integrator.

With a function order $N=2$ there results in a similar calculation:

$$y(p) = \frac{A_2(1 + B_1 p + B_2 p^2)}{B_2(1 + A_1 p + A_2 p^2)} \cdot x(p)$$

$$B_2 y(t) + A_1 B_2 \dot{y}(t) + A_2 B_2 \ddot{y}(t) = A_2 x(t) + A_2 B_1 \dot{x}(t) + A_2 B_2 \ddot{x}(t)$$

$$y(t) = x(t) + \int_O^t \left( \frac{B_1}{B_2} x(t) - \frac{A_1}{A_2} y(t) + \int_O^t \left[ \frac{1}{B_1} x(t) - \frac{1}{A_1} y(t) \right] dt \right) dt$$

It will thus be apparent that the supplementary device of the second order consists of two integration stages, of which the last processes the result of the first. It is further apparent that the first integration stage is identical with that of the supplementary device of the first order, whereas the last integration stage possesses a similar construction, with the difference that the auxiliary adder not only adds together the non-processed value $x(t)$ to which there is applied the coefficient $(B_1/B_2)$ and the processed value $y(t)$ to which there is applied the coefficient $(-A_1/A_2)$, rather adds thereto also the output value of the first integration stage.

The general formulation of the operation of a supplementary device of the Nth order, written according to Laplace notation, can be expressed as follows:

$$y(p) = \frac{A_N(1 + B_1p + B_2p^2 + \ldots + B_Np^N)}{B_N(1 + A_1p + A_2p^2 + \ldots + A_Np^N)} \cdot x(p)$$

The further calculation is complicated and produces the expected result, namely, that the supplementary device of the Nth order consists of N-integration stages of the same construction, each of which processes the result of the preceding stage, with the exception of the first stage which of course has no preceding integration stage. Additionally, the coefficients which are applied to the non-processed value $x(t)$ in the different integration stages, considered in series are $(1/B_N)$, $(B_1/B_N)$, $(B_2/B_N)$, $\ldots$ $(B_{N-1}/B_N)$; the coefficients which are applied to the processed value $y(t)$ in the different integration stages considered in series are $(-1/A_N)$, $(-A_1/A_N)$, $(-A_2/A_N)$, $\ldots$ $(-A_{N-1}/A_N)$.

All coefficients are realized therefore from the operation of the supplementary device which is predicated upon the calculations in conjunction with the supplementary adder as the low-pass of the Nth order, which operation is selected while taking into account the characteristics of the regulation circuit to be improved. For instance, for a supplementary device of the first order the selection of $A_1$ and $B_1$ is determined by the desired maximum ascent of the amplitude factor as well as by the frequency range where there occurs such ascent. In the case of a supplementary device of the second order, for the selection of $A_1$, $B_1$, $A_2$ and $B_2$ there is additionally taken into account the desired course of the ascent of the amplitude factor over the corresponding frequency range. In the case of greater orders there are considered further derivatives of the amplitude factor over the frequency range.

The control switch is preferably constructed as a reversing switch, the common pole of which is coupled with the input of the integrator whereas a respective one of both remaining poles is coupled with the output of the auxiliary adder and with the source of a null-reference voltage, respectively. Consequently, in the case of an interrupted connection between the auxiliary adder and the integrator there is avoided the effect of possible disturbance voltages upon an input of the integrator which is so to speak "hanging in the air" or "floating."

A further construction of the inventive regulation system is predicated upon the recognition that with non-regulated operation of the load, for instance with open regulation circuit and with a manually introduced command magnitude or one which is introduced by means of a computer, the turning-on of the regulation by closing the regulation circuit only then does not bring about any deflection of the feedback magnitude if in the supplementary device there is formed the proper output value at the output of each integration stage. An example of such non-regulated operation occurs with a target tracking-theodolite when the sensor temporarily does not detect the target and a computer takes over the control until the sensor is again functional, something which occurs for instance when the target is a rocket which is detected by means of an infra-red sensor and momentarily disappears behind a portion of the terrain, for instance behind the peak of a mountain or a building. Another situation of such non-regulated operation occurs with a space capsule if its position with respect to certain stars is regulated and such are temporarily covered by part of the space capsule.

With open regulation circuit for the formation of the output values in the integration stages of the supplementary device there is not available the input magnitude of the regulator normally delivered by the sensor. The command magnitude is randomly introduced, for instance by a computer; it does not reflect the condition of the regulation system. The adjustment magnitude corresponds only to the command magnitude. Only the feedback magnitude can be used for the formation of the starting values in the integration stages, but in the case under consideration it is either not detected by the sensor or is not processed and delivered as the input magnitude of the regulator. Therefore special measures must be undertaken in order to ensure for the desired formation of the starting values in the integration stages.

The regulation system preferably forms the combination of the regulation device located in the regulator, the adjustment element and the load of an integrator of the Z-order. Furthermore, in the regulator there is arranged between the input adder and the supplementary adder on the one hand and between the supplementary adder and the regulation device on the other hand a respective one of two regulation circuit switches which can be actuated by a switching or reversing signal. Additionally there is arranged at the load a second feeler delivering the Z-time derivative of the feedback magnitude, the output of which is connected at the output of a respective integrator in each instance via the series connection of a second multiplier and a second switch actuated by the switching signal. Finally, the control switches which can be actuated by the control signal also can be actuated by the switching signal wherein the switching signal brings about the closing of the second switch and the opening of the control switch and the regulation circuit switch.

The switching or reversing signal, upon absence of the input magnitude of the regulator is produced by an appropriate control device which, for instance, is arranged at the sensor and monitors the presence of a signal from the sensor. Also when the system is manually operated the switching signal is produced, for instance by a device which is coupled with the control device provided for manual operation.

It is to be accentuated that the sensor and the second sensor do not sample the same time derivative of the feedback magnitudes and that it is just for this reason that the second sensor does not drop out of operation simultaneously with the sensor. For instance, by means of the sensor there is detected a position and by the second sensor a velocity or an acceleration, which operations occur based upon completely different physical principles and therefore are not prone to the same disturbances.

For the selection of the multiplication or multiplier coefficients initially due to a suitable selection of the characteristic of the second sensor the transmission function of the open switching circuit formed by the regulation device, the adjustment element, the load and the second sensor, is set equal to 1 for the case of a constant adjustment magnitude, whereafter with a supplementary device of the Nth order the multiplier coefficient of the second multiplier associated with the $i$-th integration stage is selected to be equal to $(A_i\text{-}B_i)/A_N$. It should be apparent that the result is equivalent if it is directly obtained with suitable multipliers coefficients without previously setting the transmission function equal to 1: Yet, however, the analyses of the obtained result is rendered more difficult, so that there will not be described hereinafter this basically more favorable situation. Also there will be first here still mentioned that smoothing filters and such type devices at the output of the second sensor can be advantageous.

With the presence of the switching or reversing signal the supplementary adder is separated from the regulation circuit by the opened regulation circuit switch. By virtue of the selection of the transmission function the output magnitude at the second sensor is equal to that magnitude $y(t)$ which prevails at the output of the supplementary adder with closed regulation circuit and has brought about the same state or condition of the regulation system. This output magnitude $y(t)$ after appropriate multiplication at the relevant output is infed to the integrators located in the supplementary device. At the input of the integrators the control switches are opened, so that there is integrated the value null, leaving unchanged the values introduced at the outputs of the integrators. Thus, the supplementary adder has applied at its first input the value null and at its second input the value $$y(t) \cdot \frac{A_N - B_N}{A_N},$$

which has been introduced at the output of the Nth integrator stage.

Upon the absence of the switching signal the supplementary adder closes the regulation circuit. On the other hand, the infeed of the momentary value $$y(t) \cdot \frac{A_i - B_i}{A_N}$$

to the output of the $i$-th integration stage is interrupted by the second switch, these momentary values however remain as starting values for the now arising integration at the output of the momentary integration stages. Additionally, the transmission function of the supplementary device with the connected supplementary adder in the build-up or swing-in state of the regulation system (adjustment magnitude constant) is equal to $A_N/B_N$, as is apparent from the definition equation for $p=0$. From this there follows that during the build-up state a predetermined value Y at the output of the supplementary adder is caused by a value $X = Y \cdot (B_N/A_N)$ at the first input of the supplementary adder. Since the second input of the supplementary adder has applied thereto the value $Y \cdot (A_N\text{-}B_N)/A_N$, there appears at the output of the supplementary adder exactly the value Y, which corresponds to the condition of the regulation system: Upon the absence of the reversing or switching signal there does not occur any surge-like change in the regulation system.

An analogous result, related to the integrator of the $(i+1)$-th integration state, is realized with the condition that the latter at the moment of the absence of the switching signal receives the sum $$(Y \cdot \frac{A_i - B_i}{A_N} - Y \cdot \frac{A_i}{A_N} + X \cdot \frac{B_i}{B_N})$$

which is formed by the corresponding auxiliary adder. Owing to the fact that $X = Y \cdot (B_N/A_N)$, the value to be integrated at each integration stage with the exception of the first in the series with the built-up condition of the regulation system, identically is equal to null. Also at the first integration stage the value to be integrated is equal to null because there the auxiliary adder forms the sum $$(\frac{X}{B_N} - \frac{X}{A_N}),$$

which identically is equal to null.

There is thus realized the result that with the regulation system having been swung-in or built-up the transition from the computer-controlled operation or the manual-control operation to the regulated operation occurs without any surge-like change.

With a preferred embodiment of the supplementary device in an integrator stage the integrator consists in known manner of an operational amplifier, the inverting input of which is connected with one terminal of an integration resistor and the non-inverting input of which is connected with a source of a null-reference voltage, whereas the output of which is connected via an integration capacitor with the inverting input. Additionally, the inverting input of the operational amplifier is connected with the output of such operational amplifier via a series circuit of the second switch actuatable by the switching signal and a second resistor, this series circuit being connected in parallel to the integrator capacitor. Finally, there is arranged in the integration stage an additional operation switch constructed as a reversing switch and actuatable by the switching or reversing signal, the common pole of which operation switch is connected with the other terminal of the integration resistor, whereas one of both remaining poles of the additional operation switch is connected via the control switch with the output of the auxiliary adder associated with the integration stage and the other remaining pole with the output of the second multiplier associated with the integration stage.

Upon the absence of the switching signal and the control signal, the second switch is opened. Additionally, the control switch and the operation switch are in a series circuit configuration, and the output of the auxiliary adder is connected via the integration resistor with the inverting input of the integrator. In this switching state the operational amplifier functions as an integrator. With an integration resisitor R and an integration capacitor C the transmission function between the output of the auxiliary adder and the output of the operational amplifier, formulated according to the Laplace mathematical notation, is equal to $(1/RCp)$.

Upon appearance of the control signal the connection between the output of the auxiliary adder and the inverting input of the integrator is interrupted by the control switch. The value appearing at the output of the operational amplifier remains because the integration capacitor in this switching state cannot discharge. It is of advantage, however not absolutely necessary, if the inverting input of the integrator is connected by means of the control switch with the null-reference source: By virtue of doing such there is not changed anything as far as the result is concerned, but there are avoided, however, disturbances which might arise at the integrator due to possibly applied stray voltages.

Upon appearance of the reversing or switching signal the output of the second multiplier is connected via the integration resistor R with the inverting input of the integrator, and additionally, with closed second switch the integration capacitor C is shunted by the second resistor Z. In this switching state the transmission function between the output of the second multiplier and the output of the operational amplifier, again formulated according to Laplace notation, equals $$\frac{Z}{R} \cdot \frac{1}{(1 + ZCp)},$$

constituting a low-pass filter with a time-constant (ZC) and gain (Z/R) at the frequency null. Hence, in the built-up state of the system (adjustment magnitude constant) there appears at the output of the operational amplifier the output value of the second multiplier which has had applied thereto a coefficient (Z/R).

Preferably the values of the second resistor Z and the integration resistor R in the $i$-th integration stage are in the ratio $$\frac{Z}{R} = \frac{A_i - B_i}{A_N},$$

which ratio is equal to the desired multiplier coefficients of the associated second multiplier. Consequently, the second multiplier is already installed in the circuitry of the operational amplifier, it is no longer present as an independent device, something which is favorable from the standpoint of the economies of the system. Furthermore, the output of the second sensor or feeler is then directly connected with the corresponding pole or terminal of the additional operation switch. Additionally, there is achieved the result that the low-pass installed at the operational amplifier advantageously smoothes the variations of the signal delivered by the second sensor.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
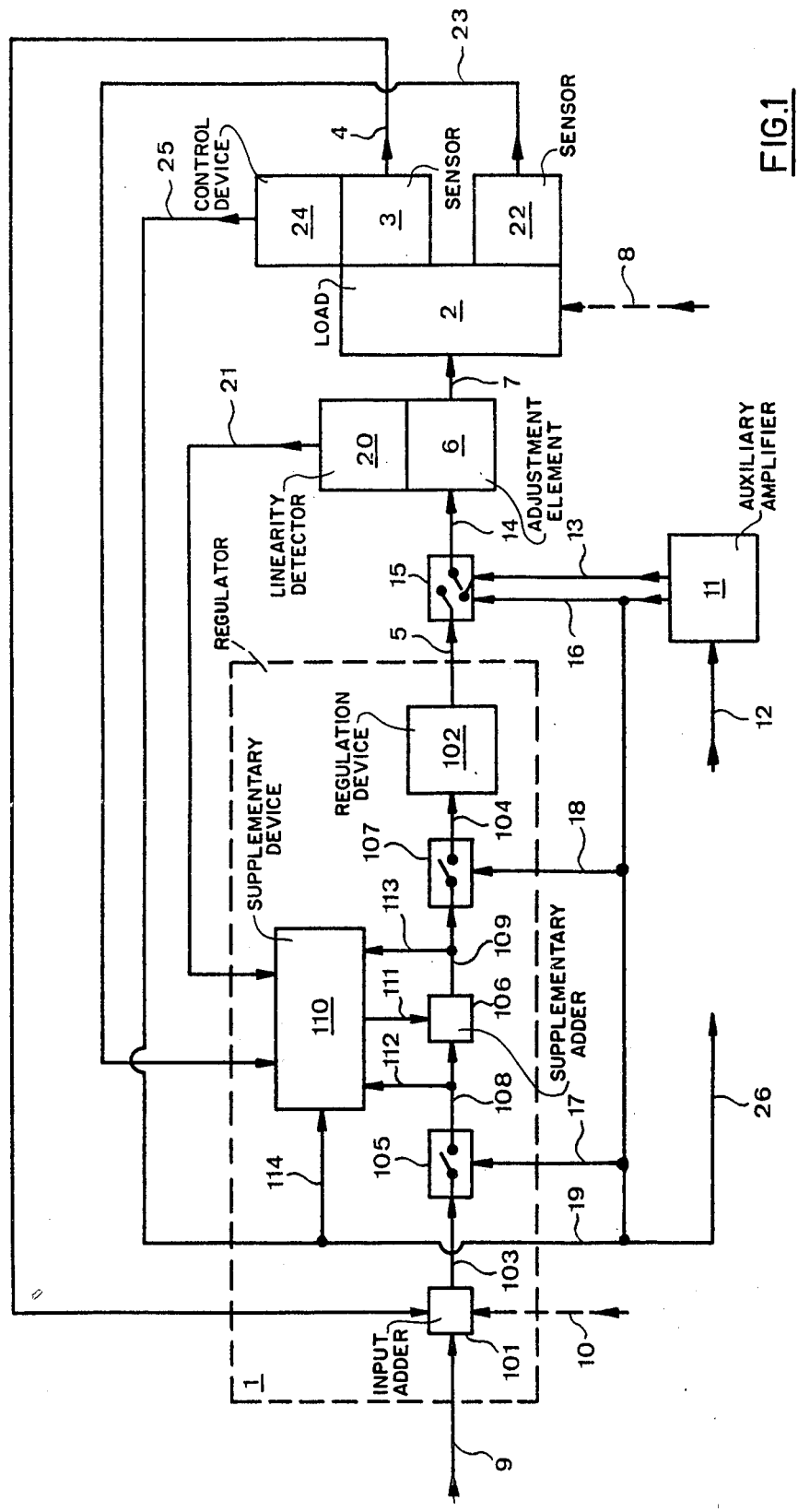
FIG. 1 is a block circuit diagram of the inventive regulation system.

Describing now the drawings, in FIG. 1 the classical regulation circuit of a regulation system consists of a regualtor 1 and a load 2. The feedback magnitude produced in the load 2 is sampled by a sensor 3, converted into an input magnitude accommodated to the regulator and delivered by means of a conductor or line 4 from the sensor or feeler 3 to the regulator 1. At the output of the regulator 1 there is delivered at the conductor 5 the adjustment magnitude produced in the regulator 1. This adjustment magnitude is delivered to an adjustment element 6 and there converted into an input magnitude accommodated to the load 2, this input magnitude then being delivered to the load 2 by means of a conductor or line 7. Possible disturbance magnitudes which act upon the load 2 are symbolized by the line 8 which leads to the load 2.

In the regulator 1 there is located an input adder 101 to which there is supplied via the conductor or line 4 the feedback magnitude converted as an input magnitude. On the other hand, the input adder 101 also receives via the line 9 a random predetermined command magnitude, and the line 10 symbolizes possible disturbance magnitudes which act upon the regulator 1.

According to one example of such regulation system the load 2 is a thermostat and the feedback magnitude is constituted by a temperature. The sensor or feeler 3 is a thermo-element. The command magnitude at the line 9 is a voltage which corresponds to the reference temperature whereas the regulator 1 receives through the agency of the conductor or line 4 a voltage corresponding to the actual temperature. The adjustment element 6 is an amplifier which controls a current flowing in the conductor or line 7 and which heats a heating resistor located in the laod 2.

Figure 1A:
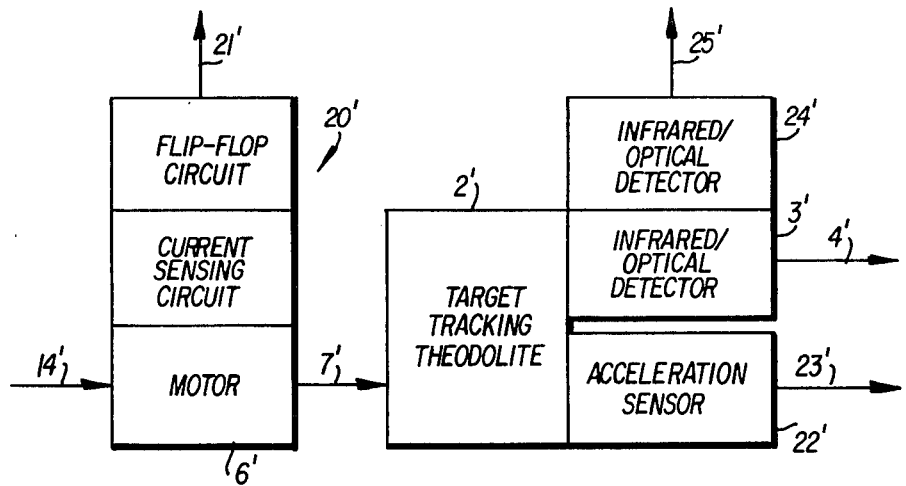
FIGS. 1a and 1b are block circuit diagrams of two examples of systems for which the inventive regulation system has particular application.

Referring to FIGS. 1 and 1a, according to a first exemplary embodiment of the regulation system the load 2 is constituted by a target tracking-theodolite 2', and the feedback magnitude 4' is the angular position of the axis of the theodolite, for instance in the azimuth direction. The sensor 3 is an infra-red detector 3', the optical axis of which practically coincides with the optical axis of the theodolite 2' and which delivers a voltage proportional to the target deviation. In this instance the actual value of the regulation system constitutes the actual direction of the axis and the reference value of the regulation system is constituted by the direction of the target. Due to the physical functionality of the infra-red detector 3' there is united therein the sensor 3 and the input adder 101 in that the infra-red detector 3' directly delivers the difference of the feedback magnitude (actual value) and the command magnitude (reference value). Due to this physical integration of the sensor 3 and the input adder 101 the comments concerning the regulation system are not in any way diminished. Within the framework of this example the adjustment element 6 is constituted by a motor 6' which brings about suitable angular movement of the axis of the theodolite 2' in the azimuth direction. The adjustment magnitude at the conductor 14' is constituted by the supply current of the motor 6', and the input magnitude of the theodolite 2' at the conductor or line 7' is constituted by the rotational speed of the motor shaft, which is integrated as a function of time into an angular change in the theodolite 2'.

Referring again to FIG. 1, for the direct manual-controlled operation or computer-controlled operation of the load the command magnitude determined by the operator or by the computer is supplied via a conductor or line 12 to an auxiliary amplifier 11 suitable for actuating the adjustment element 6, and the adjustment magnitude appears at conductor or line 13. The adjustment element 6 has delivered thereto the adjustment magnitude via a conductor or line 14, which, depending upon the mode of operation of the load (manual- or regulation operation), is connected with the conductor 13 or with conductor 5 by means of the operation switch 15 constructed as a reversing switch. The operation switch 15 is controlled by a switching or reversing signal into its desired switching state. The switching signal is advantageously produced by the auxiliary amplifier 22 when there appears at the conductor or line 12 a command magnitude, whereupon the switching signal appears at a conductor 16 and from such location is delivered to the operation switch 15. In this manner there occurs, as needed and automatically, the switching from the manual operation to the regulation operation and vice versa.

In the regulator 1 there is arranged a regulation device 102, which in a classical regulation system processes the difference of the feedback magnitude and the command magnitude formed by the input adder 101 and appearing at the conductor 103 into an adjustment magnitude which then appears at the conductor or line 5. In the regulation system under discussion the output conductor or line 103 of the input adder 101 is not directly connected with the input conductor 104 of the regulation device 102 rather through the agency of the series circuit of a first regulation circuit switch 105, a supplementary adder 106 and a second regulation circuit switch 107. The regulation circuit switch 105 is located between the output conductor 103 of the input adder 101 and a first input conductor 108 of the supplementary adder 106, whereas the regulation circuit switch 107 is located between the input conductor 104 of the regulation device 102 and the output conductor 109 of the supplementary adder 106. Both regulation circuit switches 105 and 107 are controlled by the switching or reversing signal which is delivered thereto by appropriate branch portions or lines 17 and 18 of the conductor or line 16, and the regulation circuit switches 105 and 107 are open when there is present the switching signal at the lines or conductors 16, 17 and 18.

In the regulator 1 there is further arranged a supplementary device 110 the function of which will be described more fully hereinafter in conjunction with FIGS. 2 to 4. The output of the supplementary device 110 is connected with a second input conductor 111 of the supplementary adder 106, so that there appears at the conductor 109 the sum of the signals appearing at the conductors 108 and 111. On the other hand, the signal appearing at the first input conductor 108 of the supplementary adder 106 is delivered via the conductor or line 112 to the supplementary device 110, whereas the signal appearing at the output conductor 109 of the supplementary adder 106 is delivered via the conductor 113 to such supplementary device 110. The switching or reversing signal is delivered to the supplementary device 110 by means of the branch portions or lines 19 and 114 of the conductor 16.

At the adjustment element 6 there is arranged a linearity detector 20 which produces a control signal when the input magnitude of the load which appears at the conductor 7 is not strictly proportional to the adjustment magnitude appearing at the conductor 14, i.e. when the transmission between the regulation device 102 and the load 2 is not strictly linear. The control signal emanating from the linearity detector 20 is delivered via the line or conductor 21 to the supplementary device 110.

As an example, the adjustment element 6 may be constituted by an amplifier which controls a current flowing in the line or conductor 7 and which current heats up a heating resistor or resistance located in the load 2. In order to insure that the heating resistance does not burn-out, the current delivered by the adjustment element 6 is limited to a maximum value. If the adjustment element 6 is over-controlled by the line or conductor 14, then a current limiter installed therein comes into play and simultaneously controls the linearity detector 20, which may be constituted by a current sensing circuit and a fip-flop circuit responsive to its output similar to the embodiment discussed in the succeeding paragraph, so as to produce a control signal. Such type devices are quite well known in the art, for instance as voltage sources with current limiters and with a lamp which illuminates when the current limiter is effective.

Figure 1B:
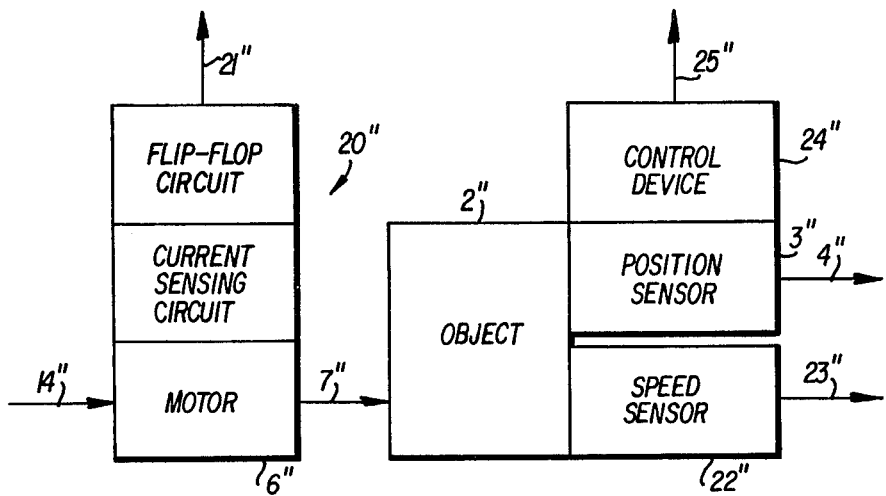

Referring now to FIGS. 1 and 1b, according to a second exemplary embodiment, the adjustment element 6 is a motor 6", the supply current of which should not exceed a maximum value otherwise the motor will burn-out. The linearity detector 20" can be a device which responds in the manner of a flip-flop circuit to the maximum value of the current (or a value slightly below such maximum value) and thus transmits the control signal. The actual current limiting can thus be incorporated in the regulator device 102 and in the auxiliary amplifier 11. On the other hand, the function of the current limiter can be combined with the function of the linearity detector into a single device 20" which controls the supply of the motor 6".

At the load 2 there is arranged a second sensor or feeler 22 which processes the feedback magnitude into an output magnitude which is of the same physical characteristic as the adjustment magnitude, but, on the other hand, of different physical characteristic than the output magnitude of the sensor 3. For instance, in the embodiment of FIG. 1b, the adjustment magnitude may be a current, the adjustment element a motor 6" and the feedback magnitude the position of an object 2" which is moved by the motor, then there is delivered by the position sensor 3" a signal on line 4" corresponding to the position or the difference between the reference position and the actual position of the object, whereas from the second sensor 22" there is delivered a signal corresponding to the speed of the object, or in the case of the embodiment of FIG. 1a, an acceleration sensor 22'. According to a further non-illustrated example, the adjustment magnitude is a current, the adjustment element a valve which controls a gas nozzle, and the feedback magnitude is constituted by the position of a space ship or capsule which is accelerated due to the reaction of the gas nozzle. The sensor 3 is then a position feeler which senses the difference of the reference position and actual position relative to certain stars, whereas the second sensor 22 now is an acceleration feeler. As a modification of this example the valve is actuated by a motor, so that the feedback magnitude (the position of the space capsule) now is constituted by the third time integral of the adjustment magnitude (the current in the motor). In this case the second sensor 22 is constructed as a feeler for changes in acceleration, i.e. by means of the second sensor there is delivered the third time derivative of the position which corresponds to the physical characteristics of the adjustment magnitude. Quite generally, the second sensor delivers the time derivative of the Zth order of the feedback magnitude when the latter is the time integral of the Zth order of the adjustment magnitude. This signal delivered by the second sensor 22 is supplied via the conductor or line 23 to the supplementary device 110.

Finally, there is arranged at the sensor 3 a control device 24 which, upon the absence of the sensor signal, delivers the switching signal which is transmitted via the line or conductor 25 to the conductors 16, 17, 18 and 19. Such absence occurs, for instance, if the sensor 3 is an optical sensor and the target to be sensed or tracked thereby is temporarily masked. The control device 24 can be constituted by a sensor or feeler of the same type as the sensor 3 with the difference that upon coincidence of the optical axis of the sensor 3 with the target direction the output magnitude of the sensor 3 becomes null because then the reference direction and actual direction coincide, whereas the control device 24, with such coincidence, processes a maximum reception signal. Additionally, in the case of the embodiments of FIGS. 1, 1a, 1b, by means of the control device 24 24', 24'', there is produced the switching signal on lines 25, 25''', 25'' respectively when the received signal drops below a predetermined threshold (FIG. 1), when the target is temporarily masked (FIG. 1a), or whenever position sensor 3'' fails to produce either a signal corresponding to the position or the difference between the reference position and the actual position of the object (FIG. 1b). The sensor or feeler 3 and the control device 24 can be combined into a single sensor, and the receiving field or zone of the sensor is subdivided and from different receiving fields there is formed the suitable summation- and difference signals in such a manner that with coincidence of the sensor axis with the target axis the one signal assumes a maximum value and the other signal becomes null.

By means of the conductor or line 26 at which there likewise appears the switching signal, there is indicated that the switching signal produced by the control device 24 is delivered to the operator or computer as data, whereupon the operator or computer must introduce the suitable command magnitudes into the conductor 12.

Figure 2:
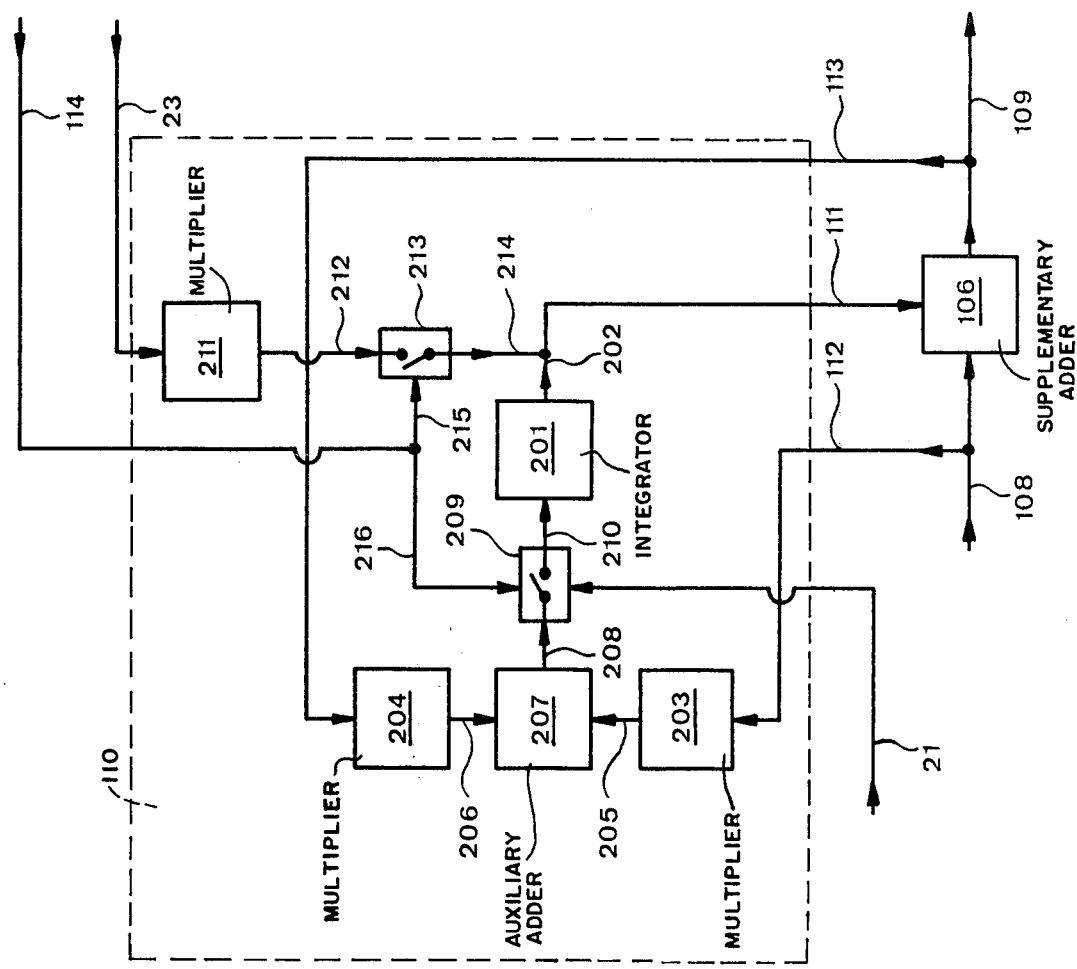
FIG. 2 is a block circuit diagram illustrating the combination of a supplementary adder and a supplementary device of the first order.
Figure 3:
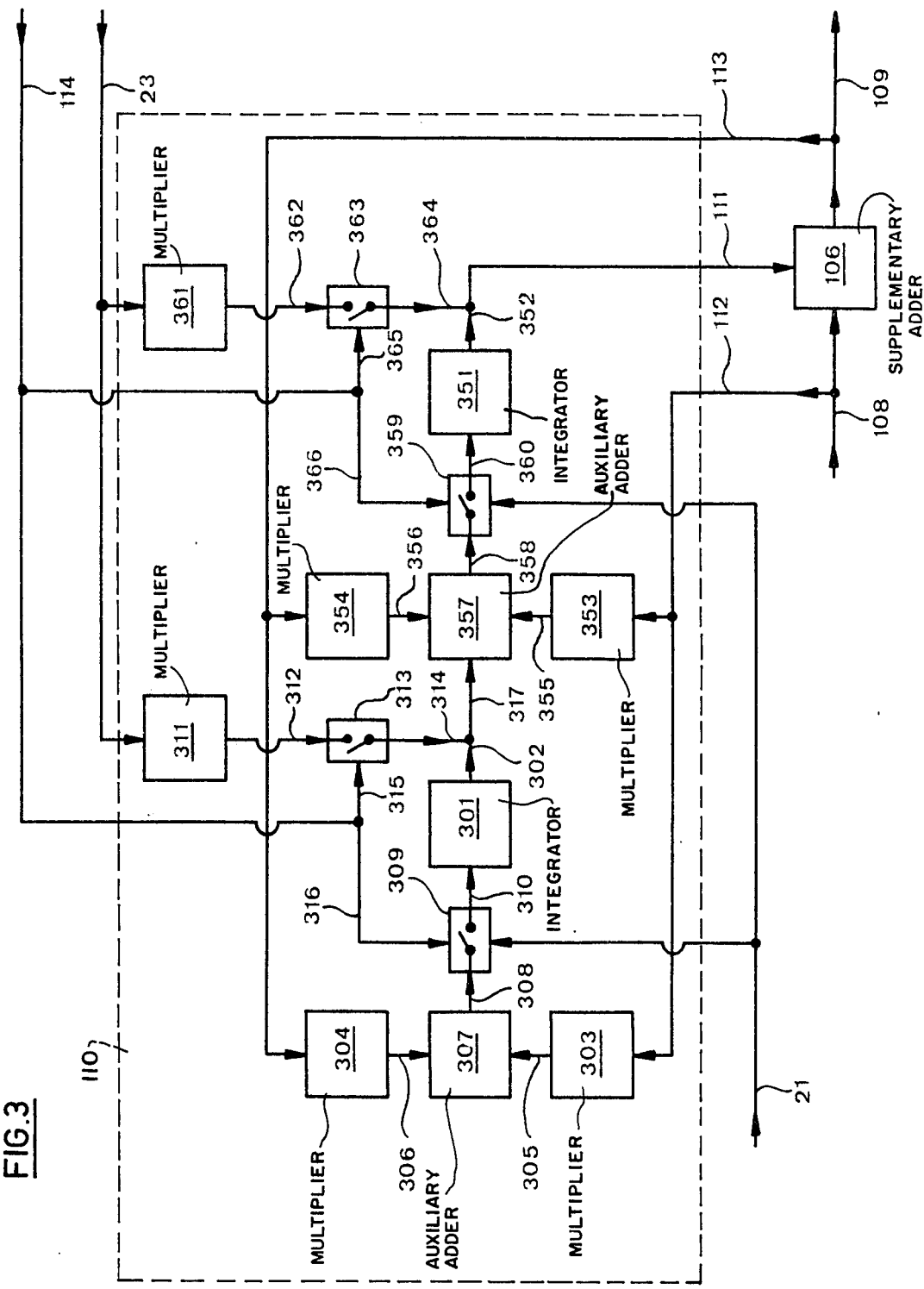
FIG. 3 illustrates in block circuit diagram the combination of a supplementary adder and a supplementary device of the second order.
Figure 4:
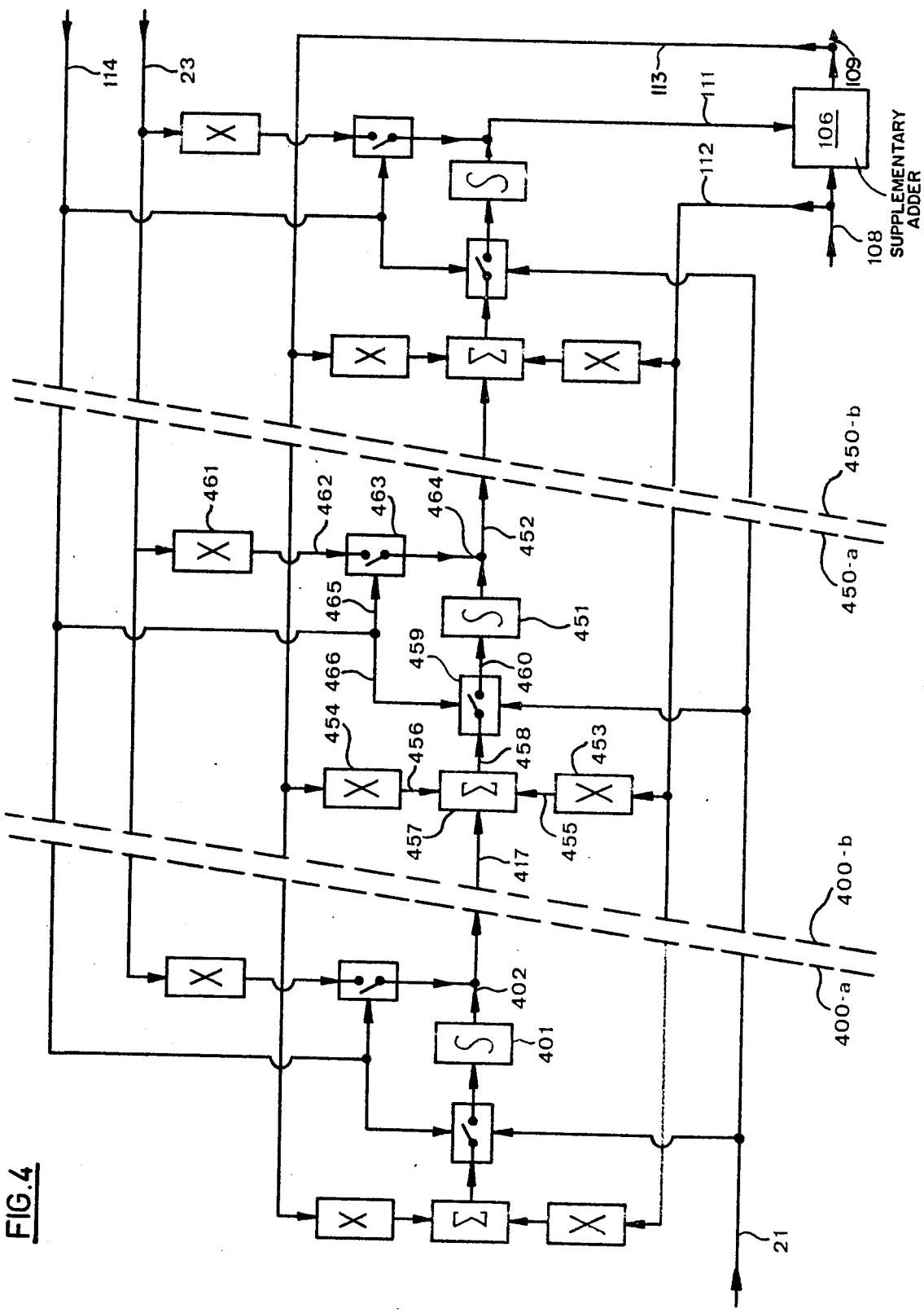
FIG. 4 is a block circuit diagram of the combination of a supplementary adder and a supplementary device of the Nth order.

In FIGS. 2 to 4 there have been indicated with the same reference characters as in FIG. 1 the supplementary adder 106 and the conduits or lines 21, 23, 108, 109, 111, 112, 113 and 114. The remaining illustrated parts or components are part of the supplementary device 110.

In FIG. 2 there is illustrated a supplementary device of the first order. It contains a single integration stage with an integrator 201, at the output of which there is connected the conductor or line 202 which is coupled with the second input conductor 111 of the supplementary adder 106 and which second input conductor or line serves as the output conductor or line of the supplementary device. The first input conductor or line 108 of the supplementary adder 106 is connected via the conductor or line 112 with the input of a first multiplier 203, whereas the output conductor 109 of the supplementary adder 106 is connected via the conductor or line 113 with the input of a second multiplier 204. The output of the first multiplier 203 is connected by means of the conductor 205 and the output of the second multiplier 204 is connected by means of the conductor 206 with a respective associated input of an auxiliary adder 207. The conductor 208 connected with the output of the auxiliary adder 207 is connected via a control switch 209 at the conductor 210 coupled with the input of the integrator 201. The control switch 209 is actuated by means of the control signal delivered via the conductor 21, and specifically in such a manner that with the presence of a control signal the control switch 209 is opened and vice versa.

The combination of the supplementary adder 106 and the supplementary device as illustrated in FIG. 2 serves the purpose of functioning as a low-pass filter of the first order. The corresponding transmission function between the conductors 108 and 109 when utilizing Laplace notation, is represented by the equation:

$$\frac{A_1(1 + B_1p)}{B_1(1 + A_1p)}$$

Starting from the characteristics of the regulation system there is determined the desired frequency response of the low-pass filter, and the transmission function for the low frequencies is equal to $(A_1/B_1)$ and for the high frequencies is equal to 1, and the corresponding transition of the transmission function approximately occurs between the frequencies $(\frac{1}{2}\pi A_1)$ and $(\frac{1}{2}\pi B_1)$. As already explained previously there thus follows therefrom the multiplier coefficient $(1/B_1)$ for the multiplier 203 and the multiplier coefficient $(-1/A_1)$ for the multiplier 204. Such type multipliers 203 and 204 as well as the auxiliary adder 207, the integrator 201 and the supplementary adder 106 are well-known conventional electronic components. With closed control switch 209 there is realized the desired low-pass effect which is eliminated upon opening of the control switch 209, without bringing about any irregularities in the regulation system.

In FIG. 2 there is additionally illustrated a second multiplier 211, the input of which is supplied via the conductor 23 with the signal from the second sensor and the output of which is connected through the agency of the conductor 212, the second switch 213 and the conductor 214 with the conductor 202 which leads from the output of the integrator 201. As already previously explained the multiplier coefficient $(A_1 - B_1)/A_1$ is provided for the second multiplier 211. The second switch 213 as well as the control switch 209 can be actuated by the switching signal which is delivered to such switches by means of the conductors 114 and 215 and 216, respectively. The switching or reversing signal causes opening of the control switch 209 and closing of the second switch 213, and additionally also the opening of the regulation circuit switches 105 and 107 (compare FIG. 1). At the output of the integrator 201 there then appears, with opened regulation circuit, the desired value in preparation for a subsequent closing of the regulation circuit, as previously explained.

In FIG. 3 there is illustrated a supplementary device of the second order in conjunction with the supplementary adder. In this supplementary device there are contained two integration stages. The first integration stage is identical in its construction with the single integration stage of the supplementary device of the first order of FIG. 2, there are only employed other multiplier coefficients. The last integration stage processes the output value of the first integration stage and possesses a similar construction, with the exception that the auxiliary adder is provided with three inputs instead of with two inputs. The additional third input is connected with the output of the first integration stage, resulting in the series circuit arrangement of the integration stages.

Under these circumstances and while keeping in mind the foregoing explanations it should be possible to shorten the description of FIG. 3 insofar as the components designated therein by reference characters 301 to 316 are of the same type and connected in the same manner as the components designated by reference characters 201 to 216 in FIG. 2. The reference characters of FIGS. 2 and 3 will be therefore understood to coincide except that the hundred place number 2 is replaced by 3. With the reference characters 301 to 316 there is thus designated the first integration stage.

Due to the similar construction of the last integration stage such can be designated in FIG. 3 with reference characters 351 to 366 which coincide with the reference characters 201 to 216 of FIG. 2 if there is considered that to the last-mentioned group of reference characters there has been added the number 150.

At this point there need only be particularly mentioned on the one hand two deviations from the complete coincidence of the components designated in FIG. 2 with the reference characters 201 to 216 and, on the other hand, the components designated in FIG. 3 with the reference characters 301 to 316 and 351 to 366. Firstly, the conductor 302 which is connected at the output of the integrator 301 is not connected with the second input conductor 111 of the supplementary adder 106 serving as the output conductor of the supplementary device, rather with a third input conductor 317 of the auxiliary adder 357. Secondly, for the multipliers 303, 304, 311, 353, 354 and 361 there are not provided the same multiplier coefficients as for the corresponding multipliers 203, 204 and 211. It should also be understood that the conductors 21, 23, 112 and 113 are branched in order to furnish both integration stages with the appropriate signals; however, such branching has not been more closely illustrated to simplify the drawing.

The combination of the supplementary adder 106 and the supplementary device as illustrated in FIG. 3 serves the purpose of functioning as a low-pass filter of the second order. The corresponding transmission function between the conductors 108 and 109 is expressed in Laplace notation by the equation:

$$\frac{A_2(1 + B_1p + B_2p^2)}{B_2(1 + A_1p + A_2p^2)}$$

Starting from the characteristics of the regulation system there is determined the desired frequency range of the low-pass filter, and the transmission function for the low frequencies is equal to $(A_2/B_2)$ and for the high frequencies is equal to 1, and the corresponding transition of the transmission function occurs approximately between the frequencies $(\frac{1}{2}\pi\sqrt{A_2})$ and $(\frac{1}{2}\pi\sqrt{B_2})$. It should be appreciated that the values $A_1$ and $B_1$ are selected such that at the low-pass filter there just is present the critical damping, so that in the frequency range the transmission function prevails with maximum slope, however with not more than an inflection point. The coefficients $A_1$ and $B_1$ are thus determined on the basis of the desired course of the first frequency derivative of the transmission function.

As already explained previously there thus result the multiplier coefficient $(1/B_2)$ for the multiplier 303, the multiplier coefficient $(B_1/B_2)$ for the multiplier 353, the multiplier coefficient $(-1/A_2)$ for the multiplier 304, the multiplier coefficient $(-A_1/A_2)$ for the multiplier 354, the multiplier coefficient $(A_1 - B_1)/A_2$ for the multiplier 311, and the multiplier coefficient $(A_2 - B_2)/A_2$ for the multiplier 361.

Upon absence of the control signal and the switching signal there results the desired low-pass effect, which upon appearance of the control signal owing to opening of the control switches 309 and 359 is eliminated, without thereby causing irregularities or instabilities in the regulation system. In the presence of the switching signal the control switches 309 and 359 also open, the second switches 313 and 363 on the other hand close, and also there is opened the regulation circuit switches 105 and 107 (compare FIG. 1). At the output of the integrators 301 and 351 there then appear, with opened regulation circuit, the desired values in preparation of a subsequent closing of the regulation circuit, as previously explained.

In FIG. 4 there is illustrated a supplementary device of the Nth-order in conjunction with the supplementary adder. In this supplementary device there are also contained N-integration stages, of which there have only been illustrated the first, the $i$-th and the last. The non-illustrated integration stages are identical in construction with the $i$-th integration stage and conceptually appear between the pair-wise arranged broken lines 400-$a$ and 400-$b$ and 450-$a$ and 450-$b$, respectively. The first integration stage is identical in construction with the first integration stage illustrated in FIG. 3, attention again being invited to reference characters 301 to 316, whereas the last integration stage is identical in construction with the last integration stage illustrated in FIG. 3, likewise attention being directed to reference characters 351 to 366. Consequently, for brevity and simplicity in illustration most of the corresponding electronic components have not been shown in FIG. 4.

The $i$-th integration stage is illustrated between the line pairs 400 and 450. Also this integration stage is identical in construction with the last integration stage illustrated in FIG. 3, so that for the $i$-th integration stage in FIG. 4 the reference characters always coincide with the reference characters 351 to 366 of FIG. 3 if there is taken into account that in the latter the hundred place number 3 is replaced by the hundred place number 4.

As should be apparent, the circuit of FIG. 4, with N=2, becomes identical with the circuitry illustrated in FIG. 3 by omitting the integration stage illustrated between the line pairs 400 and 450 as well as such line pairs. Conversely, the supplementary device of the Nth-order is generated in a recursion-like process from the supplementary device of the second order accounting to FIG. 3 in the manner that a number (N−2) of integration stages is incorporated in a series circuit between the first integration stage and the last integration stage illustrated in FIG. 3. Moreover, the output conductor 402 of the integrator 401 of the first integration stage is connected with the third input conductor (not shown in FIG. 4) of the auxiliary adder of the next, in other words, the second integration stage, whereas the non-illustrated output conductor of the integrator of the $(i-1)$-th integration stage is connected with the third input conductor 417 of the auxiliary adder 457 of the $i$-th integration stage illustrated in FIG. 4. The same holds true for the connection between the $i$-th and the $(i+1)$-th integration stages as well as for the connection between the (N-1)th and the Nth integration stages.

The combination illustrated in FIG. 4 of the supplementary adder 106 and the supplementary device of the Nth-order serves the purpose of functioning as a low-pass filter of the Nth order. The corresponding transmission function between the conductors 108 and 109 can be expressed in Laplace notation by the equation:

$$\frac{A_N(1 + B_1 p + B_2 p^2 + \ldots + B_N p^N)}{B_N(1 + A_1 p + A_2 p^2 + \ldots + A_N p^N)}$$

Starting from the desired characteristics of the regulation system there is determined the desired frequency response of the low-pass filter, wherein the transmission function for the low frequencies is equal to $(A_N/B_N)$ and for the high frequencies is equal to 1. Moreover, the corresponding transition of the transmission function occurs approximately between the frequencies $$(\frac{1}{2}\pi \sqrt[N]{A_N}) \text{ and } (\frac{1}{2}\pi \sqrt[N]{B_N}).$$

The individual determination of the values $A_1$ to $A_{N-1}$ and $B_1$ and $B_{N-1}$ occurs on the basis of the desired course of the transmission function at the region of the transition, in other words the desired course of the first, second, ... (N-1)th derivative of the transmission function with respect to the variable "frequency." Again, the coefficients are chosen such that in the frequency range the transmission function extends with maximum slope, however with not more than an inflection point.

As already previously explained there thus result the multiplier coefficients. In the $i$-th integration stage there is employed for the multiplier 453 the multiplier coefficient $(B_{i-1}/B_N)$, for the multiplier 454 the multiplier coefficient $(-A_{i-1}/A_N)$ and for the multiplier 461 the multiplier coefficient $(A_i - B_i)A_N$. The thus attained effect with the presence or absence of the control signal and/or the switching signal is the same as described in conjunction with the supplementary device of the second order, only in this case the low-pass effect is of the Nth-order instead of the second order.

Figure 5:
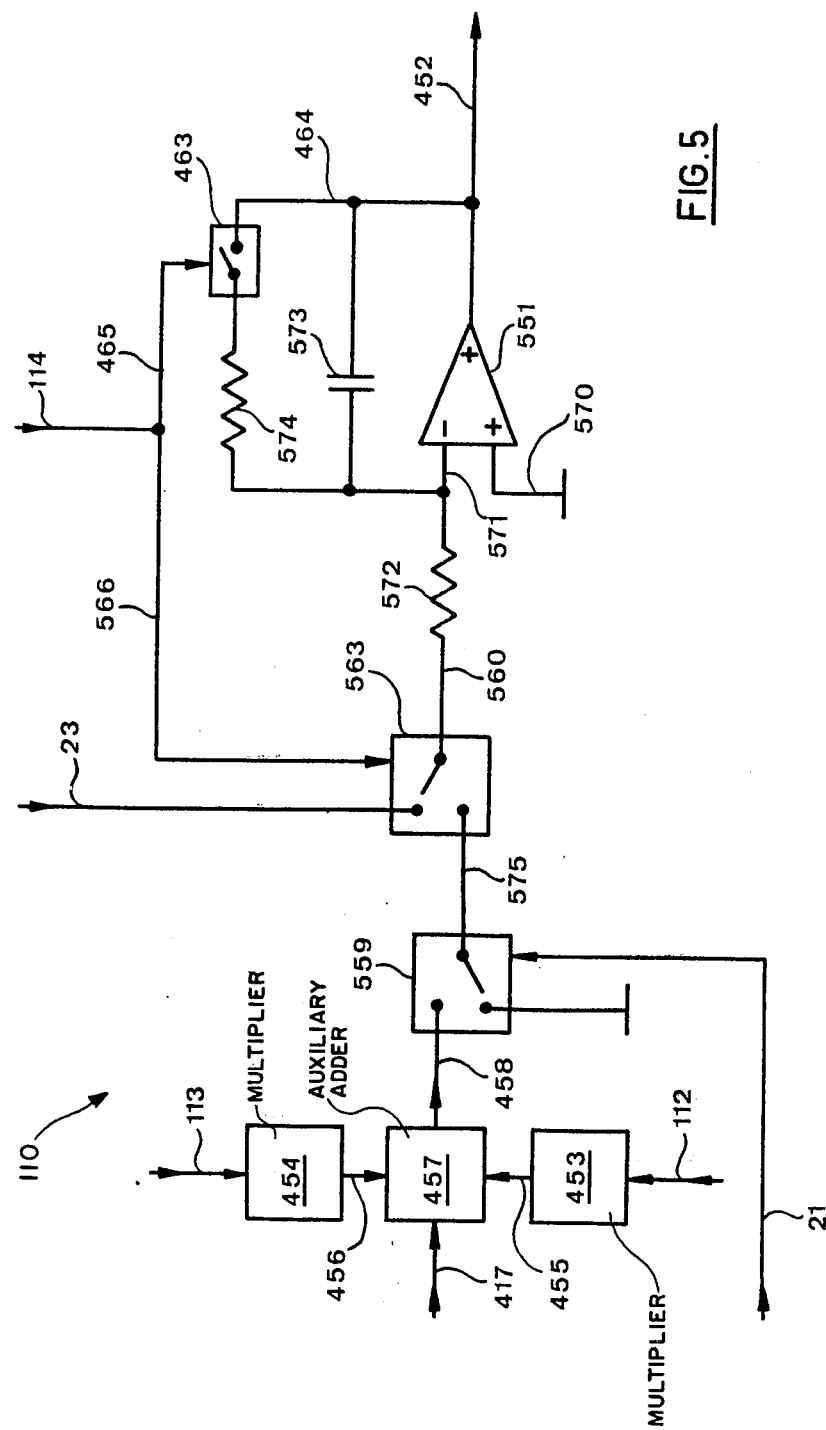
FIG. 5 illustrates a preferred construction of an integration stage in a supplementary device.

While referring to FIG. 1 and FIG. 4 there will be considered hereinafter in Boolean algebra the condition of the different switches as a function of the control signal and the switching signal. With the symbol "0" the considered switch is opened and there is missing the considered signal, whereas with the symbol "1" the switch is closed and the signal is present. There is valid the following:

Control switch (459 and the like) = $\overline{\text{Control signal}}$ + Switching signal
Second switch (463 and the like) = Switching signal
Regulation circuit switch (105, 107) = Switching signal In FIG. 5 there is illustrated a preferred embodiment of an integration stage of the supplementary device, for instance, the $i$-th integration stage of the illustration of FIG. 4. For analagous elements of the circuit diagram of FIGS. 4 and 5 there have been conventiently utilized the same reference characters. The heart of this construction of integration stage is the use of an operational amplifier 551, the non-inverting input of which is connected via a conductor 570 with ground which delivers a null-reference voltage, and the inverting input of which is connected via a conductor 571 with the one terminal of an integration resistor 572 with which there is coupled one terminal of an integration capacitor 573 and one terminal of a second resistor 574. The other terminal of the second resistor 574 is connected with the one pole of the second switch 463, the other pole of which is connected via the conductor 464 with the output of the operational amplifier 551 and specifically with its output conductor 452. The other terminal of the integration capacitor 573 is likewise connected with the output of the operational amplifier 551 via the conductors 464 and 452. The other terminal of the integration resistor 572 is connected with the input conductor 560 of the combined-acting structure of the elements 551, 572, 573 and 574 as well as 463. If the value of the integration resistor 572 is designated by reference character R, the value of the integration capacitor 573 by reference character C and the value of the second resistor 574 by reference character Z, then depending upon the condition of the second switch 463 of the aforementioned structure there is carried out one of the following functions:

a. With opened second switch 463 the aforementioned structure functions as an integrator, the transmission function of which between its input conductor 560 and its output conductor 452 expressed in Laplace notation can be represented by $(1/RCp)$.

b. With closed second switch 463 the afore-mentioned structure functions as a low-pass filter of the first order, the transmission function between its input conductor 560 and its output conductor 452 expressed in Laplace notation can be represented by $$\frac{Z}{R} \cdot \frac{1}{(1 + ZCp)}.$$

In this last-mentioned function (b) for low frequencies the aforementioned structure is equal to $(Z/R)$. Thus, it is equivalent, according to FIG. 4, to introduce the signal from the second sensor via the conductor 23 to a second multiplier 461 in which it has applied thereto the multiplier coefficient $(A_i - B_i)/A_N$, and to then furnish such to the output conductor 452 of the integration stage, or according to FIG. 5, to introduce this signal from the conductor 23 to the input conductor 560 of the aforementioned structure and to take into account the transmission function $(Z/R)$. In so doing if the values R and Z are further chosen such that there is valid the equation $$\frac{Z}{R} = (\frac{A_i - B_i}{A_N}),$$

then the multiplier coefficient of the associated second multiplier is equal to 1, i.e. the latter becomes superfluous, which of course provides a saving in cost and therefore is advantageous. Additionally, the low-pass action of the afore-mentioned structure is advantageous in order to smooth the signal emanating from the second sensor or feeler.

In the first above-mentioned function (a) the output conductor 458 of the auxiliary adder 457 is to be connected via the control switch 559 with the input conductor 560 of the aforementioned structure. Therefore, there should be arranged in the integration stage an additional operation switch 563 constructed as reversing switch, the common pole of which is connected with the input conductor 560, whereas one of both remaining poles of the additional operation switch 563 is connected via the control switch 559 with the conductor 458 and the other remaining pole with the conductor 23. The additional operation switch 563 is controlled by the switching or reversing signal which is introduced thereto via the conductors 114 and 566. In the absence of the switching signal and the control signal then the output conductor 458 of the auxiliary adder 457 is connected with the input conductor 560 of the structure, whereas the second switch is opened. With the presence of the switching signal the second switch 463 is closed and the conductor 23 is connected with the input conductor 560.

The control switch 559 interrupts the connection between the auxiliary adder 457 and the additional operation switch 563 when there appears a control signal which is delivered from the conductor 21 to the control switch 559. In FIG. 5 the control switch 559 is likewise constructed as a reversing switch, the common pole of which is connected with the corresponding pole of the additional operation switch 563 via the conductor 575, whereas each respective one of both remaining poles is connected with the output of the auxiliary adder 457 via the conductor 458 and with ground, respectively. Upon application of the control signal to the conductor 21 there is interrupted the connection between the conductors 458 and 575 by the control switch 559, and the conductor 575 is connected with ground, thereby ensuring that there appears thereon the voltage null. Thus, there is prevented that stray voltages can reach the input conductor 560 with a corresponding position of the additional operation switch 563, which could easily happen in the case of conductor 560 so to speak standing "in the air" or "floating." There is maintained the voltage which has built-up at the output of the operational amplifier 551, because it is defined by the voltage which has built-up at the integration capacitor 573 and such cannot discharge provided that there is not present any switching signal.

With simultaneous presence of a control signal and the switching signal the control switch 559 remains ineffectual.

While there is shown and described present preferred embodiments of the invention, it is to be distinctly understood that the invention is not limited thereto, but may be otherwise variously embodied and practiced within the scope of the following claims. Accordingly,

What is claimed is:

1. A self-adjusting regulation system comprising a regulator incorporating an input adder for forming the difference of a feedback magnitude from a load and a command magnitude and for producing an error signal and a regulation device for forming an adjustment magnitude from said error signal, an adjustment element for limiting the value of the error signal received by the load, a linearity detector, said adjustment element controlling said linearity detector, said linearity detector delivering a control signal upon the presence of a nonlinear behaviour of the regulation system, a supplementary adder arranged in the regulator between the input adder and the regulation device, said regulation device having an input, said supplementary adder having a first input, a second input and an output, said input adder having an output, the first input of the supplementary adder being connected with the output of the input adder, the output of the supplementary adder being connected with the input of the regulation device, a supplementary device having an output connected with the second input of the supplementary adder, said supplementary device comprising a number N of similar integration stages forming a series, each integration stage comprising an integrator having an input and an auxiliary adder having an output connected with the input of the integrator via a control switch responsive to the control signal, the auxiliary adder having a first input connected via a first multiplier with the first input of the supplementary adder and having a second input connected via a second multiplier with the output of the supplementary adder, the output of the integrator of the last integration stage of the series forming the output of the supplementary device, and for the remaining integration stages the output of the integrator of a predetermined integration stage is connected with a third input of the auxiliary adder of the next following integration stage of the series.

2. The self-adjusting regulation system as defined in claim 1, wherein the number N of integration stages is at least two.

3. The self-adjusting regulation system as defined in claim 1, wherein said control switch comprises reversing switch means having three poles, a first one of said poles defining a common pole connected with the input of the integrator via an additional operation switch, a second one of said poles being connected with the output of the auxiliary adder and the third pole being connected with a source of null-reference voltage.

4. The self-adjusting regulation system as defined in claim 1, wherein in the regulation system the combination of the regulation device of the regulator, the adjustment element and the load forms an integrator of the Zth order, a respective regulation circuit switch is arranged in the regulator between the input adder and the supplementary adder and between the supplementary adder and the regulation device, means responsive to the feedback magnitude for delivering a switching signal when the feedback magnitude is substantially zero, each of said two regulation circuit switches being responsive to said switching signal, sensor means arranged at the load for delivering the Zth time derivative of the feedback magnitude, the output of said sensor means being connected with the output of a respective integrator in each instance via the series circuit of a third multiplier and a second switch responsive to the switching signal, and wherein different control switches are responsive to the control signal and to the switching signal, the switching signal bringing about closing of the second switch and opening of the control switches and the regulation circuit switches.

5. The self-adjusting regulation system as defined in claim 4, wherein each integration stage of the integrator comprises an operational amplifier having an inverting input and a non-inverting input, an integration resistor and an integration capacitor, the inverting input of the operational amplifier being connected with a first terminal of the integration resistor and the non-inverting input with a source of a null-reference voltage, and the output of the operational amplifier is connected via the integration capacitor with the inverting input, said inverting input of the operational amplifier being connected with the output of the operational amplifier via a series circuit of the second switch and a second resistor, said series circuit being connected in parallel with the integration capacitor, an additional operation switch arranged in the integration stage and constructed as a reversing switch responsive to the switching signal, said additional operation switch having three poles including a first pole comprising a common pole connected with a second terminal of the integration resistor, a second pole connected via the control switch with the output of the auxiliary adder associated with the integration stage and a third pole is connected with the output of the third multiplier associated with the integration stage.

6. The self-adjusting regulation system as defined in claim 5, wherein the relationship of the value of the second resistor to the value of the integration resistor is equal to the multiplier coefficients of the third multiplier, and wherein an output of the sensor means is connected with the third pole of the additional operation switch.

7. A self-adjusting regulation system comprising a regulator incorporating an input adder for forming the difference of a feedback magnitude from a load and a command magnitude and for producing an error signal and a regulation device for forming an adjustment magnitude from said error signal, an adjustment element for limiting the value of the error signal received by the laod, sensor means arranged at the load for supplying said regulator with an input signal corresponding to the feedback magnitude, a linearity detector, said adjustment element controlling said linearity detector, said linearity detector delivering a control signal upon the presence of a non-linear behaviour of the regulation system, a supplementary adder arranged in the regulator between the input adder and the regulation device, said regulation device having an input, said supplementary adder having a first input, a second input and an output, said input adder having an output, the first input of the supplementary adder being connected with the output of the input adder, the output of the supplementary adder being connected with the input of the regulation device, a supplementary device having an output connected with the second input of the supplementary adder, said supplementary device comprising a number N of similar integration stages forming a series, each integration stage comprising an integrator having an input and an auxiliary adder having an output connected with the input of the integrator via a control switch responsive to the control signal, the auxiliary adder having a first input connected via a first multiplier with the first input of the supplementary adder and having a second input connected via a second multiplier with the output of the supplementary adder, the output of the integrator of the last integration stage of the series forming the output of the supplementary device, and for the remaining integration stages the output of the integrator of a predetermined integration stage is connected with a third input of the auxiliary adder of the next following integration stage of the series.

* * * * *